March 25, 1952  M. W. LOOMER  2,590,334
COMBINED HEATING ELEMENT AND THERMOMOTIVE
DEVICE FOR COOKING DEVICES OR TOASTERS
Filed Feb. 27, 1948  3 Sheets-Sheet 1
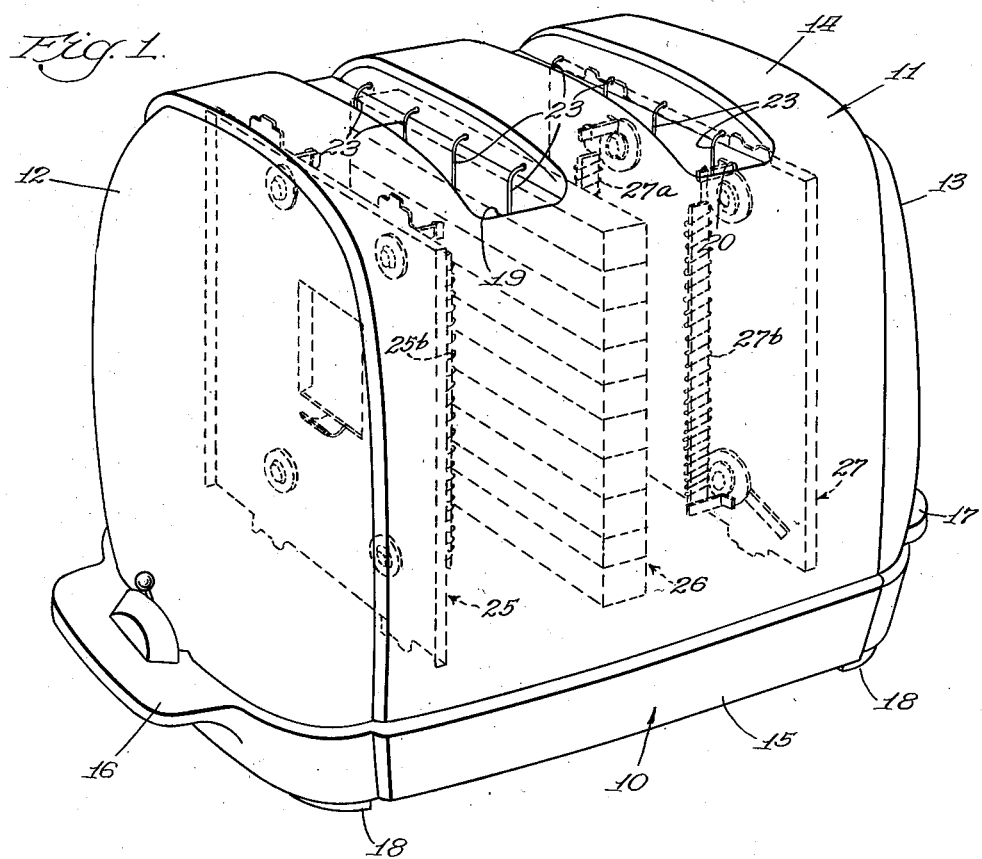
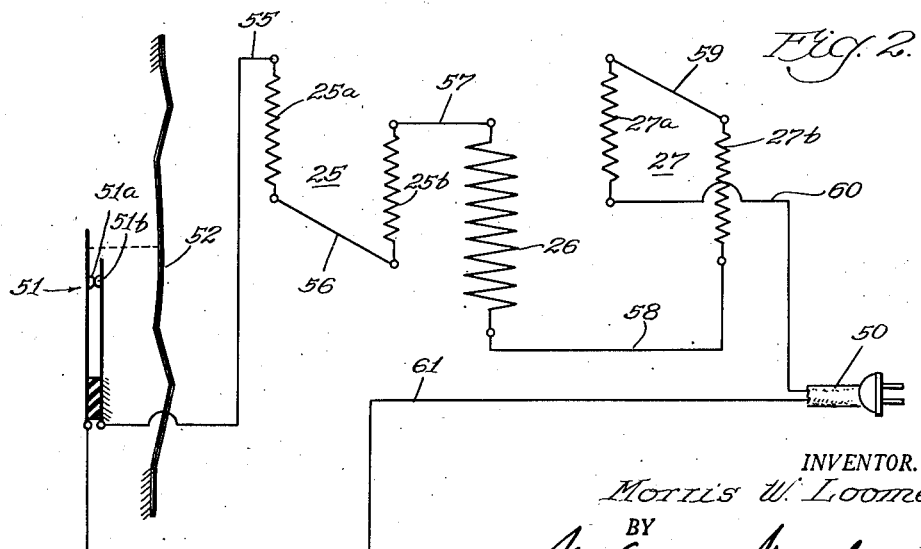
INVENTOR.
Morris W. Loomer
BY
McCanna & Morsbach
Attys.

INVENTOR.
Morris W. Loomer
BY
McCanna & Morsbach
Attys.

March 25, 1952

M. W. LOOMER 2,590,334

COMBINED HEATING ELEMENT AND THERMOMOTIVE
DEVICE FOR COOKING DEVICES OR TOASTERS

Filed Feb. 27, 1948

INVENTOR.
Morris W. Loomer
BY
McCanna & Morsbach
Attys.

Patented Mar. 25, 1952

2,590,334

UNITED STATES PATENT OFFICE 2,590,334

COMBINED HEATING ELEMENT AND THERMOMOTIVE DEVICE FOR COOKING DEVICES OR TOASTERS

Morris W. Loomer, Bellwood, Ill., assignor to Sunbeam Corporation, Chicago, Ill., a corporation of Illinois Application February 27, 1948, Serial No. 11,646

8 Claims. (Cl. 99—335)

1

The present invention relates to a combined heating element and thermomotive device, particularly applicable for use in an automatic toaster, and more specifically is an improvement on an arrangement disclosed and claimed in co-pending Koci application Serial No. 5,247 filed January 30, 1948, and assigned to the same assignee as the present application.

In the above mentioned co-pending Koci application there has been disclosed a cooking device in the form of an automatic toaster in which advantage is taken of the mechanical work available by virtue of the contraction and expansion of a metal due to change in temperature thereof. A thermomotive device is employed to convert the expansion and contraction of such a metal in response to change in temperature thereof to mechanical work for moving the bread carriage in a toaster and consequently for moving the bread slices disposed on the bread carriage to and from the toasting position. Actually the bread carriage will move in one direction by virtue of the action of gravity, and the thermomotive device is designed to permit gravity to act when the toasting operation is initiated, while at the end of the toasting operation the thermomotive device actually lifts the bread carriage to the toast receiving or toast removing position. Such a thermomotive device has been found to require the expenditure of several hundred watts of electrical energy to perform the desired lifting operation of the bread carriage. Where a separate thermomotive device is employed for this purpose, this energy is totally wasted, except for the very small percentage thereof converted to mechanical work. Actually about 1100 watts of electrical energy are conventionally employed in such automatic toasters for the toasting operation from which no mechanical work is normally obtained. It would be desirable, therefore, to provide a combined heating element and thermomotive device so that the heating element might function the same as the conventional heating elements of the prior art, as far as performing a heating or toasting operation is concerned, but which heating element would also function so that the desired movement of the bread carriage automatically results at the desired times.

Accordingly it is an object of the present invention to provide a heating element for an automatic toaster which also functions as a thermomotive device for moving the bread carriage to and from the toasting position.

It is another object of the present invention to

2 provide a thermomotive device for an automatic toaster which also functions as the center heating element of such toaster.

A further object of the present invention resides in the provision of a heating element for a cooking device which in addition to its heating function also acts to produce movement of the material to be cooked relative to the heating element.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 1 is a perspective view of a cooking device in the form of an automatic toaster embodying the present invention;

Fig. 2 is a schematic circuit diagram of the electrical circuit and control arrangement of the automatic toaster embodying the present invention;

Figure 3:
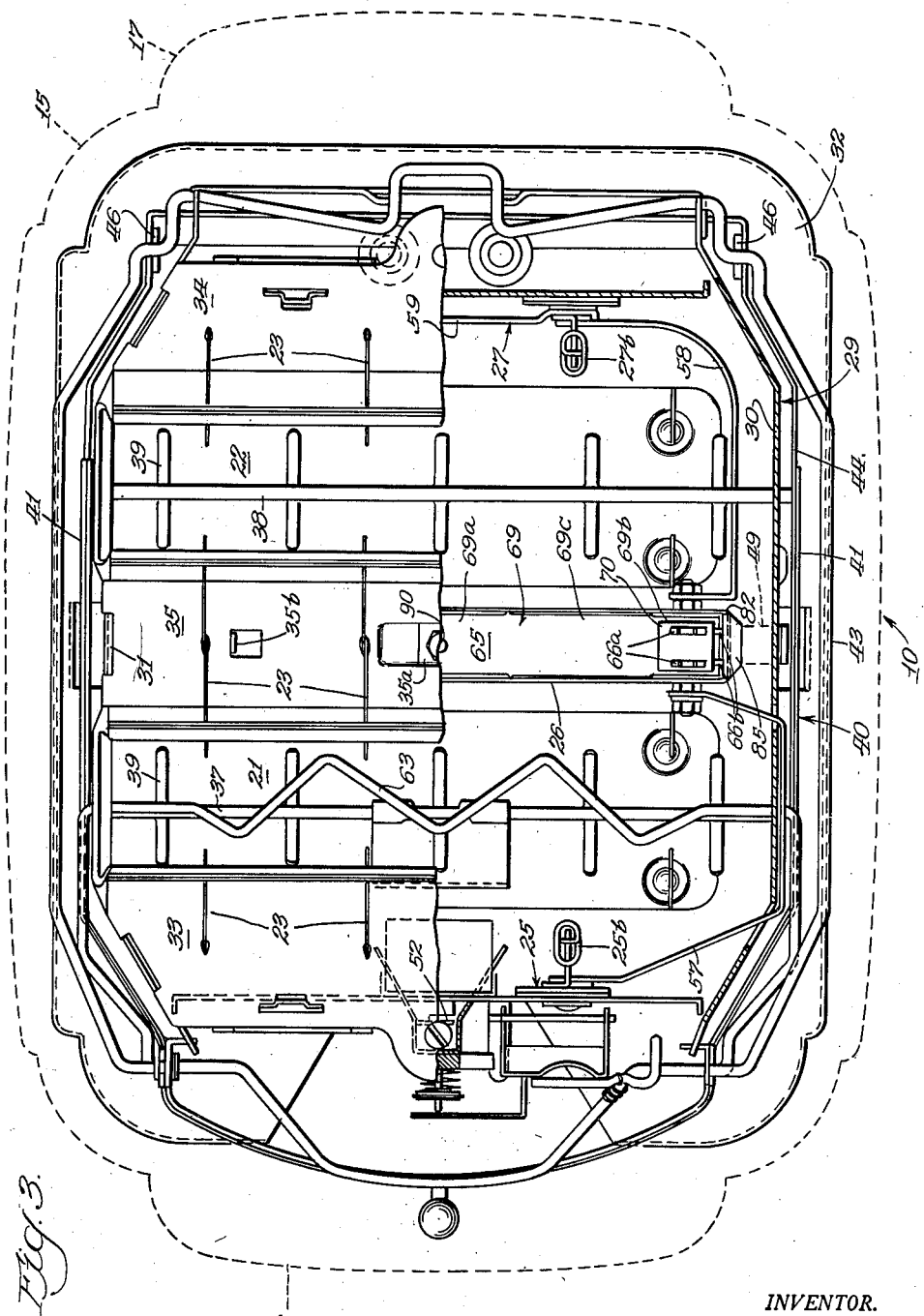
Fig. 3 is a top plan view of the automatic toaster with the outer casing thereof removed and with one half of the toaster shown in section in order to more clearly illustrate the position of the combined heating element and thermomotive device of the present invention.

Referring now to the drawings, the automatic toaster generally designated by the reference numeral 10 in Fig. 1 comprises an outer casing generally designated at 11 comprising a pair of end shell members 12 and 13 and a U-shaped central shell member 14 cooperating with the end shell members 12 and 13 to provide an outer casing or housing 11 for the toaster. A suitable base 15 is also provided, preferably formed of a suitable insulating material which base includes integrally formed handle portions 16 and 17 at either end thereof and suitable feet 18 at the bottom thereof. Since the present invention is primarily concerned with a combined heating element and thermomotive device, the particular construction of the other parts of the automatic toaster which have been illustrated to show a specific application of the present invention are immaterial as far as the present invention is concerned. The novel features of such automatic toaster are fully disclosed in the co-pending Koci application Serial No. 5,247 referred to above. Any description included herein of such parts of the automatic toaster other than the combined heating element and thermomotive device are included merely to provide a better understanding of a particular application of the present invention where it is especially effective.

The shell or outer casing 11 includes spaced parallel slots 19 and 20 at the top thereof for the insertion of slices of bread, and effectively the slots 19 and 20 define the entrances to toasting chambers 21 and 22 clearly shown in Fig. 3 of the drawings. Actually these toasting chambers are defined between a plurality of vertically disposed guide wires 23 which are suitably supported from the frame portion of the toaster. These guide wires do not interfere with the radiation between the heating units generally designated as 25, 26 and 27 which are disposed at opposite sides of the toasting chambers 21 and 22. It will be apparent that the toasting chamber 21 is disposed between the heating units 25 and 26, whereby both sides of a bread slice disposed in a toasting chamber 21 may be simultaneously toasted. Similarly the toasting chamber 22 is disposed between the heating units 26 and 27. The heating unit 26 therefore is effective simultaneously to heat adjacent sides of bread slices disposed in both toasting chambers 21 and 22. Although a conventional two-slice toaster has been illustrated it will be understood that it might equally well comprise a single slice toaster or a toaster for more than two slices.

Figure 4:
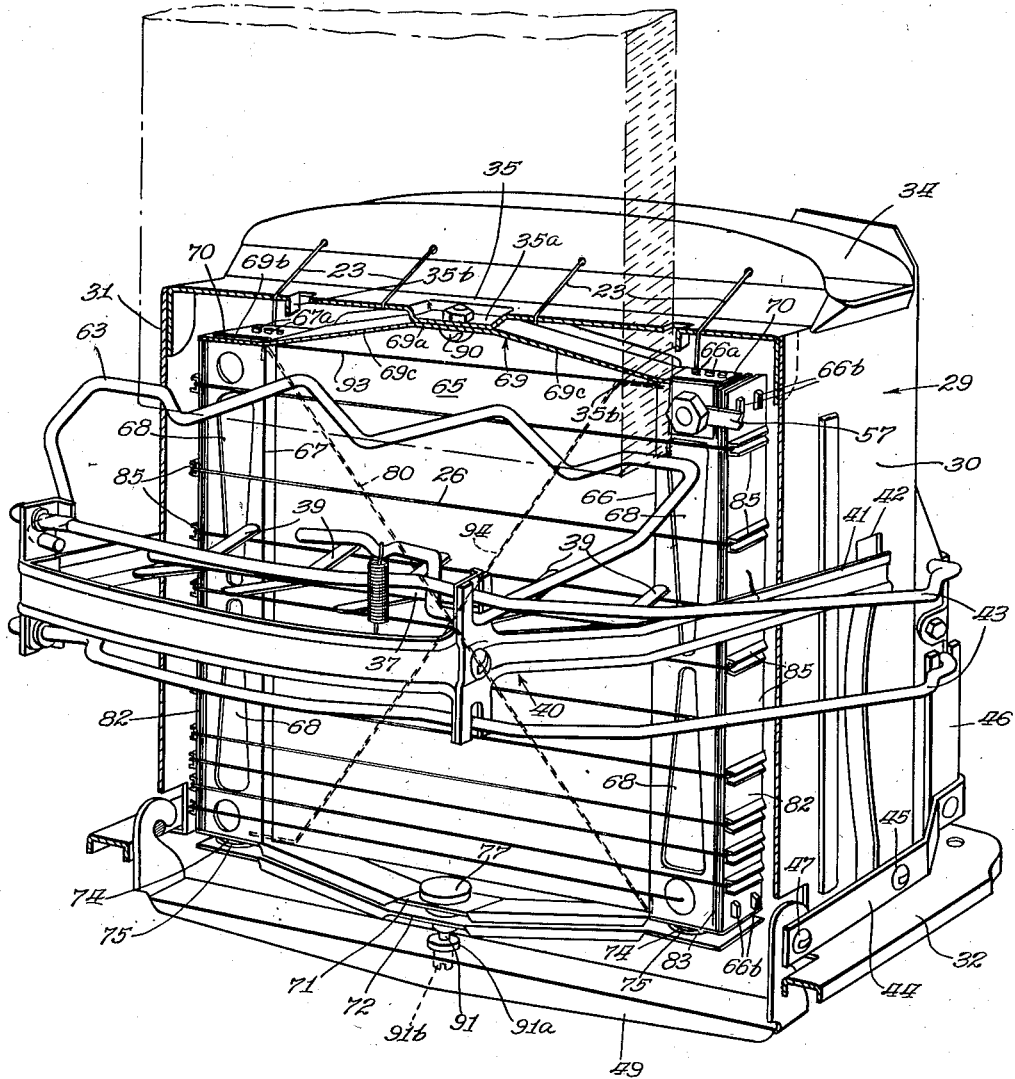
Fig. 4 is a perspective view of the automatic toaster of the present invention with substantial portions thereof removed in order to show the combined heating element and thermomotive device of the present invention and its relationship to the movable bread carriage.

Referring now to Figs. 3 and 4 of the drawings where the toaster is shown without the shell 11 and the base 15, or at most these parts are indicated by dashed lines, it may be noted that within the outer shell or housing 11 there is disposed an inner frame generally designated at 29. This inner frame comprises a pair of side frame plates 30 and 31, a subbase plate 32, a pair of top end frame plates 33 and 34 and a top center plate 35. To provide additional rigidity some of these frame members are provided with peripheral flanges, or strengthening ribs, or are of U-shaped configuration. The end top frame plates 33 and 34 are each spaced from the center top frame plate 35 to define a pair of spaces or slots in line with the bread receiving slots 19 and 20 and consequently are in a sense means defining an entrance to the toasting chambers 21 and 22. The various frame plates such as 30, 31, 32, 33, 34 and 35 are united in any suitable manner so as to define a unitary structure. For the purpose of simplifying the ensuing description the end of the automatic toaster adjacent the top frame plate 33 is designated as the thermostat end while the end adjacent the top frame plate 34 is designated as the cord end. The reason for these designations will become apparent from the following description. It should be understood that the thermostat or other control device employed and the power cord could be disposed at either end of the toaster or at the same end for that matter.

Any automatic toaster requires means not only for supporting material to be toasted in the toasting position, but also requires means for moving the material to be toasted from a toast receiving position to a toasting position and upon completion of the toasting operation back to the toast receiving position so that the toast may readily be removed. As illustrated in Figs. 3 and 4 of the drawings, there are disposed in the toasting chambers 21 and 22 a pair of horizontally disposed vertically movable bread racks or supports 37 and 38, the bread rack 37 being disposed in the toasting chamber 21 and the rack 38 being disposed in the toasting chamber 22. Essentially the bread racks 37 and 38 comprise central rod like members extending transversely of the toasting chambers each including V-shaped fingers 39 with the open ends of the V extending upwardly so as to tend to center any sliced material being placed thereon. As illustrated, and as fully disclosed in the co-pending Koci application, Serial No. 5,247 referred to above, the bread racks 37 and 38 form a part of a movable bread carriage generally designated at 40 and which includes side arms 41 which are welded or otherwise suitably fastened to the ends of the bread racks 37 and 38. The side frame plates 30 and 31 are provided with suitable vertically extending slots such as the slot 42 shown in Fig. 4 of the drawings through which the ends of the bread racks 37 and 38 fastened to the side arms 41 may extend so as to permit vertical movement of the bread carriage 40.

As illustrated the bread carriage 40 is movably supported from the frame 29 by means of pivotally mounted parallel motion arms 43 in a manner fully disclosed in the above mentioned Koci application whereby pivotal movement of the parallel motion arms causes the bread carriage 40 to move in a substantially vertical direction and to be maintained in a substantially horizontal position throughout such vertical movement thereof. The parallel motion arms 43 are adapted to be connected by means of a suitable linkage, which is designed so as to produce a substantial motion multiplication, to the combined thermomotive device and heating unit with which the present invention is particularly concerned. As illustrated this linkage comprises a lifter lever 44 pivotally mounted to the frame 29 as indicated at 45. The lifter lever is preferably a U-shaped member with the bight portion of the U being connected with the parallel motion arms 43 through suitable links 46. The ends of the arms of the U-shaped lifter lever 44 are suitably connected as indicated at 47 with a depressor bar 49 extending beneath the frame 29 of the automatic toaster and interconnecting the ends of the lifter lever 44. As is fully disclosed in the above mentioned co-pending application the linkage interconnecting the depressor bar 49 and the bread carriage 40 is capable of producing a motion multiplication of approximately twenty-two to one so that about one eighth inch vertical movement of the depressor bar 49 produces approximately three inches of movement in a vertical direction of the bread carriage 40. It will be apparent from an examination of Fig. 4 of the drawings that when the depressor bar 49 is moved downwardly the links 46 are moved upwardly and the bread carriage 40 is furthermore moved in an upward direction. Conversely when the depressor bar 49 is permitted to move upwardly the bread carriage 40 is permitted to move downwardly. The motion of the bread carriage 40 is therefore opposite to the motion of the depressor bar 49 and is much greater in extent as was mentioned above.

For the purpose of readily distinguishing between the specific heating units 25, 26 and 27 they are designated specifically as the thermostat end heating unit 25, the center heating unit 26 and the cord end heating unit 27. The end heating units 25 and 27 form no part of the present invention and may be of any desired construction. Since the automatic toaster with which the present invention is employed is preferably of the type employing a radiation thermostat control of the type disclosed and claimed in copending Koci application Serial No. 639,934 filed January 9, 1946, now Patent 2,459,169, and also assigned to the same assignee as the present application, the end heating elements 25 and 27 are preferably of the form disclosed and claimed in co-pending Koci application, Serial No. 11,102 filed February 26, 1948, and also assigned to the same assignee as the present application. As illustrated the thermostat end heating unit 25 comprises a pair of spaced linearly disposed heating elements 25a and 25b while the cord end heating unit 27 comprises similarly spaced heating elements 27a and 27b. The heating elements are schematically indicated in Fig. 2 of the drawings where the center heating element 26, to be described in greater detail hereinafter, is also disclosed.

It will be understood that any suitable means for supplying electrical energy to the heating elements 25a, 25b, 26, 27a and 27b may be provided. These individual heating elements may be connected in parallel, in series or in some sort of series-parallel combination. The particular manner of supplying them with electrical energy may best be understood by reference to Fig. 2 of the drawings where the heating elements are illustrated as all being connected in series with one another and to a suitable source of power through the conventional appliance cord 50. As illustrated in Fig. 2 of the drawings the electrical circuit comprises in addition to the heating elements the control switch 51 comprising the relatively movable contacts 51a and 51b adapted to be opened through operation of the thermostat 52. When the contacts of the control switch 51 are in the open position, the circuit through the serially arranged heating elements is interrupted. Conversely when the switch 51 is closed the circuit through the serially arranged heating elements is closed and if the appliance cord 50 is connected to a suitable source of electricl energy, current will flow through the heating elements in a well understood manner.

For the purpose of serially interconnecting the various heating elements, suitable bus bars are provided which are preferably disposed in the automatic toaster so as to be suitably spaced from any adjacent conducting portions for satisfactory insulation therefrom and furthermore so as not to interfere with any of the moving parts of the toaster a swell as to be free of the toasting chambers and the like. These bus bars are schematically indicated in Fig. 2 of the drawings. To this end the upper end of the toasting element 25a is connected by means of a suitable bus bar 55 with one terminal of the switch 51. The lower ends of the heating elements 25a and 25b are interconnected by means of a bus bar 56. To interconnect the upper end of the heating element 25b and the upper end of the center heating unit 26 there is provided a suitable bus bar 57. The lower end of the center heating unit 26 is illustrated as being electrically interconnecting by means of a bus bar 58 with the lower end of the heating element 27b. A suitable bus bar 59 interconnects the upper ends of the heating elements 27b and 27a. The lower end of the heating element 27a is connected by means of a lead bus bar 60 with a suitable terminal stud not shown, which in turn is suitably connected to one lead of the power cord 50. The other lead of the power cord 50 is connected by means of a conductor 61 with the other terminal of the switch 51 thus completing the electrical circuit through the heating units.

Since the automtic toaster 10 is preferably of the type in which the insertion of the bread slice initiates the toasting operation automatic means must be provided to close the switch 51 in response to the insertion of such bread slice. As illustrated there is provided in the toasting chamber 21 a trip lever 63 pivotally supported by the bread carriage 40. This trip lever 63 when subjected to the weight of a bread slice pivots in a clockwise direction as viewed in Fig. 4 of the drawings and actuates suitable means, not shown but fully described and shown in the above mentioned Koci application Serial Number 5,247 for moving the thermostat 52 and consequently the associated switch 51 to the closed position.

The present invention is concerned with employing one of the heating units of the automatic toaster as a thermomotive device as well as a heating element. It will be understood that any one of the heating units could perform this dual function and this is particularly true of the center heating element 26 and the cord end heating element 27. For the purpose of specifically illustrating the invention the center heating element 26 is indicated as performing the dual function mentioned above. The construction of the center heating element 26 which is also capable of producing the necessary mechanical movement of the bread carriage is preferably similar to that disclosed and broadly claimed in the above mentioned copending Koci application Serial No. 5,247.

Referring now to Fig. 4 of the drawings there is illustrated the combined thermomotive device and center element heating unit generally designated at 65 comprising a plurality of spaced turns of nickel chromium wire generally designated as 26 to conform with the designation heretofore employed for the center heating element since the turns of nickel chromium wire function as the heating element.

For the purpose of greatly multiplying the motion produced by virtue of the change in length of the different turns or loops of the wire 26 when heated by current flow therethrough the thermomotive device 65 comprises an expansible support in the form of spaced insulated vertical structures around which the turns of the resistance wire 26 are wound, which structures in turn are supported by specially shaped yokes or trusses formed from thin stainless steel spring stock. As illustrated the spaced vertical structures comprise a pair of channel or U-shaped strut members 66 and 67 disposed with the closed ends or bights of the U-shaped members disposed towards each other. These vertical strut members are provided with openings 68 in order to make them as light as possible without appreciably reducing the rigidity thereof. The upper ends of the struts are interconnected by a V-shaped truss or yoke 69 having a relatively shallow angle, i. e. the angle defining the V is approximately 150°. As a consequence a very small change in the lengths of the loops of the resistance wire 26 due to expansion under the application of heat, permits a relatively large vertical motion of the center of the truss or yoke 69 even though the ends thereof move very slightly in a horizontal direction. The V-shaped truss 69 is designed with an unflanged relatively horizontal central portion 69a and unflanged horizontal end portions 69b. These portions 69a and 69b are interconnected by flanged angular portions 69c as is clearly shown in Figs. 3 and 4 of the drawings. Flexing or bending of the truss 69 can therefore only occur in the unflanged central portion 69a or the unflanged end portions 69b. The truss 69 due to its construction from spring stock inherently tends to straighten out and continually exerts a force tending to separate the strut members 66 and 67 which action is restrained by the turns of the resistance wire 26.

In order to connect the upper ends of the struts 66 and 67 with the ends 69b of the truss or V-shaped yoke 69 the struts 66 and 67 are provided with integral extensions 66a and 67a respectively which extend through suitable openings defined in the ends 69b of the truss 69 and through openings in truss washers 70, which extensions 66a and 67b are peened over as indicated thereby fixedly to interrelate the struts 66 and 67 and the truss 69.

In order further to multiply the limited relative movement of the struts 66 and 67 by virtue of the expansion and contraction of the resistance wire 26, the lower ends of the struts 66 and 67 are similarly interconnected by two spaced trusses 71 and 72 which are very similar to the truss 69. Two trusses are employed to prevent skewing of the frame defined by the struts 66 and 67 and the trusses 69, 71 and 72 under the tensile force due to the resistance wire 26 wound thereon. As illustrated, the lower ends of the struts 66 and 67 are provided with sufficiently long projections to extend through suitable openings in the horizontal unflanged ends of the trusses 71 and 72 as well as through washers 74 and spacers 75. The ends of the projections are peened over fixedly to interrelate the ends of the trusses 71 and 72 with the lower ends of the struts 66 and 67. The trusses 71 and 72 are provided with unflanged central portions supporting a center adjusting screw bushing 77 and flanged intermediate portions substantially identical with the truss 69. A suitable truss spacer 78 maintains the central portions of the trusses 71 and 72 in spaced relationship.

In addition to the double truss arrangement at the lower ends of the struts 66 and 67 which prevent skewing in one direction of the frame of the thermomotive device 65 (comprising the struts 66 and 67 and the trusses 69, 70 and 71), the upper end of one strut such as 67 is connected by means of a suitable tension wire 80 with the lower end of the other strut 66, to prevent skewing in another direction. The ends of this diagonally disposed wire 80 may be hook-shaped to engage suitable slots defined in the upper and lower ends of the bights of the U-shaped struts 66 and 67 as is clearly indicated in Fig. 4 of the drawings.

To properly support the turns of the resistor wire 26 in the form of a spiral on the frame of the thermomotive device, in spaced relationship and insulated from the frame there are provided on each side of the frame two vertically disposed insulating strips 82 and 83 which are provided with suitable notches for receiving integral extensions 66b and 67b of the struts 66 and 67 respectively to prevent vertical movement of the strips 82 and 83 relative to the struts 66 and 67. Movement thereof in any other direction is prevented by the turns of the resistance wire 26 wound thereabout. The insulating strips 82 may be designated as the clip insulators for insulating a plurality of wire receiving clips 85 from the struts 66 and 67. The wire receiving clips 85 are preferably supported in vertically spaced notches defined in the insulating strips 82. The wire receiving clips 85 are U-shaped and maintain the individual turns of the resistance wire 26 in properly spaced relationship relative to each other. The turns of the wire 26 also aid in holding the clips 85 in position in the notches defined in the insulating strips 82.

The upper and lower ends of the resistor wire 26 are connected to suitable terminals whereby ready connection with the bus bars 57 and 58 may be made.

In accordance with the present invention the thermomotive device 65, which also functions as a heating unit, must be supported adjacent one of the toasting chambers 21 or 22 so proper heating of the bread slice is produced. The device 65 is disposed so that the relative movement between the central portions of the trusses 69, 70 and 71 may be transmitted to the depressor bar 49. The depressor bar 49 is preferably located near the center of the toaster when the thermomotive device also functions as the center heating element in accordance with the present invention. Accordingly, the central portion of the truss 69 is rigidly fastened as by means of a bolt 90 to the center top frame plate 35. So that the flanged portions of the yoke 69 do not interfere with the center top frame plate, the frame plate 35 is provided with a central depression 35a to which the bolt 90 is fastened. The center top frame plate 35 is furthermore provided with depending projections 35b preferably punched therefrom as is clearly shown in Figs. 3 and 4 of the drawings. The projections 35b are adapted to engage the ends 69b of the yoke or truss 69 to limit their maximum upward movement and consequently prevent the yoke 69 from snapping over center. With this arrangement the center 69a of the truss 69 is fixed and consequently all movement occurs at the bushing 77. In order to depress the depressor bar 49 there is provided a stud or center adjusting screw 91 threadedly engaged with the bushing 77. This stud is provided adjacent its lower end with a shoulder 91a engaging the depressor bar 49 and including a slotted projection 91b extending through a suitable opening defined in the depressor bar 49. By means of the stud 91, suitable adjustment of the motion transmitted to the depressor bar 49 by the thermomotive device 65 may be controlled.

With the combined thermomotive device and center heating unit of the present invention, a center element barrier plate is provided to confine a portion of the heat produced by the resistor wire 26 to each of the toasting chambers 21 and 22 in case a single slice is being toasted. Such a barrier plate may comprise two very thin reflector plates 93, one disposed on either side of the wire 80 which may be used to support the same. If desired an additional wire 94 may extend diagonally between the reflector plates 93 as clearly indicated in Fig. 4 of the drawings, to better support the barrier plate. The ends of the wire 94 may extend into notches in the bights of the U-shaped struts 66 and 67 adjacent the ends thereof similar to the notches for receiving the hook shaped ends of the wire 80. The center element barrier plate has no function as far as the thermomotive device of the invention is concerned but is employed only because the thermomotive device also acts as the center heating element. The turns of the resistance wire 26 near the bottom of the heating unit are spaced more closely than at the top as is clearly illustrated in Fig. 4 of the drawings in order to obtain more uniform toasting. This is necessary because of the fact that the bread slices are heated by convection as well as by radiation.

The operation of the thermomotive device 65 of the present invention with respect to the bread carriage 40 will be understood in view of the detailed description included above. When current flows through the resistor or heater wire 26 it is heated and expands thereby permitting the struts 66 and 67 to move apart slightly. Such movement of the struts causes a relatively large upward movement of the shoulder 91a of the stud or center adjusting screw 91 due to the inherent tendency of the trusses or yokes 69, 70 and 71 to try to straighten out. In an arrangement constructed in accordance with the present invention movement of the shoulder 91a in response to change in length of each loop or turn of the resistance wire was sixteen times greater than such change in length. Upward movement of the shoulder 91a frees the depressor bar 49 whereupon it is permitted to move under the weight of the bread carriage and any toast supported thereon until movement of the carriage is stopped by suitable stop means, not shown. When the current flow through the resistor wire 26 is cut of the wire cools and contracts so as to move the struts 66 and 67 toward each other slightly. The shoulder of the center adjusting screw 91 is furthermore moved downwardly and consequently forces the depressor bar 49 to move downwardly with the result that the bread carriage 40 is moved against upper stops, not shown, whereupon the toast supported thereon can readily be removed.

It will be understood that the tensile strength of nickel-chrome wire, from which the resistor wire 26 is preferably formed, is substantially less at high temperatures than when cold, and consequently it is essential that when the resistance wire 26 reaches a high temperature that substantially no tensile force is applied thereto. This is accomplished by so designing the resistance wire relative to the thermomotive device 65 that a substantial expansion thereof occurs after the bread carriage has moved to its lowermost position. In a thermomotive device constructed in accordance with the present invention, all tensile stress was removed from the resistance wire when the temperature thereof reached approximately 1100° F., although it ultimately reached an equilibrium temperature of between 1500° and 1600° F. With this arrangement the elastic limit of the resistance wire 26 was not exceeded.

By employing the resistor wire 26 of the thermomotive device 65 in a dual capacity both as a toasting or heating element as well as the means for producing mechanical work in accordance with the present invention, adequate lifting power for the bread carriage 40 is provided without requiring any additional expenditure for electrical power. Furthermore the mechanical arrangement is relatively simple and to a large degree is self-compensating for variations in manufacture. Thus, if one loop of the spirally wound resistor wire 26 happens to be wound tighter than the remainder and as a consequence assumes more than its share of stress, it will yield as that stress becomes excessive and transfer some of it to the other loops of the wire. Actually the thermomotive device 65 is designed to provide for two and one half to three times as much movement as is actually used. The main reason for this is to provide a reasonably rapid and uniform rate of movement of the bread carriage 40. A second reason is to free the loops of the wire 26 of stress after their temperature exceeds what is considered a safe limit of between 1100° and 1200° F. When current is passed through the heater wire 26, its temperature rises with time approximately in accordance with the exponential law:

$$T = T_f(1 - e^{-kt})$$

Also in cooling the temperature varies approximately in accordance with the following expression:

$$T = T_f e^{-kt}$$

where T represents the instantaneous value of temperature, $T_f$ represents the equilibrium high temperature, (both such temperatures being relative to the surrounding or ambient temperature) $e$ is the natural logarithmic base, $t$ represents time and $k$ is a constant. Actually the temperature rise departs somewhat from that indicated by the above equations because of the fourth power relationship between absolute temperature and heat dissipated as radiant energy.

Figure 5:
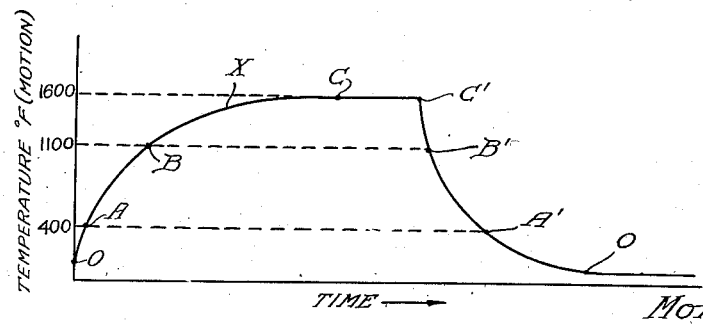
Fig. 5 is a curve diagram to aid in understanding the operation of the present invention.

On the fairly accurate assumption that an exponential law is substantially followed, reference may be had to Fig. 5 of the drawings where there is illustrated a curve diagram X in which the temperature rise and fall of the resistance wire 26 is plotted with respect to time. It is also assumed that the expansion coefficient of the resistance wire 26 is uniform within the range of temperatures that the wire is subjected to and that the motion multiplication factor remains constant. On these assumptions the curve X of Fig. 5 indicates not only the temperature change of the resistor wire with time but also the corresponding available motion of the bread carriage 40 with respect to time. Referring now to the curve diagram of Fig. 5 it may be noted that the available movement of the carriage upon heating of the resistor wire is represented by the vertical distance from O to C. The actually used movement in a properly adjusted thermomotive device such as 65 is represented by the vertical distance from A to B. It is apparent at once, therefore, that the time allowed for the bread carriage to move from a position corresponding to A to a position corresponding to B is very much less than the time required for heating the element 26 from room temperature to a temperature approaching its final temperature. Further in the range from A to B the temperature rise approaches a straight line relationship which means that the rate of rise and consequently the velocity of movement is substantially uniform in this range whereupon the bread slice is caused to move at a uniform rate of speed within the actual range of motion. As a result of all this, when the resistance wire 26 heats up during the period represented by the range from O to A in Fig. 5 of the drawings, the net result is simply a gradual release of the pressure of the bread carriage against the stops, not shown, limiting its maximum upward movement. As the temperature of the resistance wire passes beyond the point A of the curve X downward movement of the bread carriage 40 results. When the resistance wire 26 reaches a temperature of the order of 1100° F. the bread carriage 40 engages the stops, not shown, which limit its maximum downward movement so that subsequent heating of the resistor wire 26 causes the individual turns to expand thereby removing any stress on them due to the weight of the bread carriage and the bread slices being toasted since this weight is supported by the stops which are now engaged by the bread carriage. The point C in Fig. 5 represents the final temperature of about 1600° F. and in this highest range of temperature from 1100 to 1600° the resistance wire 26 is under no more longitudinal stress than in any conventional toasting element.

Upon cooling of the resistor wire from the point C' to B' of the curve X no resultant movement of the bread carriage 40 occurs and it continues to engage its lower limit stop. As is obvious from the curve of Fig. 5, the time of cooling during this range is very short so as to be substantially negligible. At the point B' the resistance 26 has cooled and contracted sufficiently to begin to encounter the stress applied through the yokes 69, 70 and 71 and the struts 66 and 67 of the weight of the bread carriage 40 and the bread slices carried thereby, and from B' to A' the contraction of the resistor wire 26 causes relative separation of the center points of the trusses or yokes 69, 70 and 71, with the result that the depressor bar 49 is moved downwardly to lift the bread carriage 40 and associated bread slices from the toasting position to the toast receiving or toast removing position. From the point A' to O the resistance wire 26 cools still further and more slowly as is clearly indicated by the curve X but no further movement of the bread carriage 40 results since such movement is prevented by the upper limit stops. Instead further contraction, at these relatively low temperatures, of the resistance wire 26 serves to increase the pressure of the bread carriage 40 against such upper limit stops. This pressure may be adjusted by means of the center adjusting screw 91 and it should at least equal the weight of two bread slices of the largest size which could be accommodated by the automatic toaster so that when such bread slices are placed on the bread carriage 40 sufficient force will still be present to hold the bread carriage against the stops until the thermomotive device 65 functions to permit movement to the toasting position.

It will be apparent to those skilled in the art that the present invention is not limited to the particular embodiment shown and described but that changes and modifications may be made without departing from the spirit and scope of the present invention. It is aimed in the appended claims to cover all such changes and modifications.

What is claimed as new and desired to be secured by Letters Patent of the United States is:

1. The combination in a toaster of spaced heating elements for performing a toasting operation on a bread slice disposed therebetween, a movable carriage for moving said bread slice toward and away from a position between said heating elements, said heating elements comprising an expansible wire which expands and contracts with heating and cooling, and means connected to said carriage utilizing the expansion and contraction of said wire for moving said carriage relative to said heating elements.

2. The combination in a toaster of spaced heating elements for performing a toasting operation on a bread slice disposed therebetween, a movable carriage for moving said bread slice toward and away from a position between said heating elements, one of said heating elements comprising a plurality of turns of a conductor of relatively small cross section, means utilizing the expansion and contraction of said conductor with heating and cooling connected to said carriage for moving said carriage relative to said heating elements, an electric circuit including both of said heating elements, and a control switch for controlling the energization of said electric circuit, whereby upon energization thereof expansion of said conductor results in movement of said carriage in one direction and upon deenergization thereof contraction of said conductor results in movement of said carriage in said other direction.

3. In a cooking device, a heating unit comprising a plurality of turns of a resistance wire which expands upon heating and contracts upon cooling, a movable carriage for supporting material to be heated thereon and movable relative to said heating unit, said heating unit cooking material disposed on said movable carriage, and means connected to said carriage utilizing the expansion and contraction of said resistance wire for moving said carriage.

4. In an automatic toaster, a toasting chamber, a heating unit comprising a plurality of turns of an expansible and contractible resistance wire disposed adjacent said toasting chamber for heating one side of a bread slice disposed in said toasting chamber, a movable carriage for supporting a bread slice to be toasted thereon and movable within said unit, and means connected to said carriage and utilizing the contraction of said resistance wire for moving said carriage in a manner to move a bread slice disposed thereon out of said toasting chamber, said last mentioned means permitting said carriage to move a bread slice under the action of gravity into said toasting chamber upon expansion of said wire.

5. In an automatic toaster, a toasting chamber, a heating unit comprising a plurality of turns of a resistance wire disposed adjacent said toasting chamber for heating one side of a bread slice disposed in said toasting chamber, a movable carriage for supporting a bread slice to be toasted thereon and movable within said unit, and means connected to said carriage and utilizing the contraction of said resistance wire upon cooling thereof following a toasting operation for moving said carriage in a manner to move a bread slice disposed thereon out of said toasting chamber, said last mentioned means permitting said carriage to move a bread slice under the action of gravity into said toasting chamber upon expansion of said wire following heating thereof.

6. In an automatic toaster, a pair of spaced heating units arranged to define a toasting chamber therebetween, a movable carriage comprising means for moving a bread slice into and out of said toasting chamber, one of said heating units comprising a plurality of turns of a conductor of relatively small cross section, means connected to said bread carriage and including means for utilizing the expansion and contraction of said conductor with heating and cooling for moving said carriage into and out of said toasting chamber in response to such expansion and contraction of said conductor, an electric circuit including both of said heating units, and a control switch for controlling the energization of said electric circuit, whereby upon energization thereof expansion of said conductor occurs to permit movement of said carriage into said toasting chamber and upon deenergization thereof contraction of said conductor occurs to move said carriage out of said toasting chamber.

7. In an automatic toaster, a pair of spaced heating units arranged to define a toasting chamber therebetween each capable of heating one side of a bread slice disposed in said toasting chamber, a movable carriage comprising means for moving a bread slice into and out of said toasting chamber, one of said heating units comprising a movable support and a plurality of turns of a conductor of relatively small cross section, means interconnecting said bread carriage and said support to cause movement of said carriage into and out of said toasting chamber in response to the expansion and contraction of said conductor with heating and cooling, an electric circuit including both of said heating units, and a control switch for controlling the energization of said electric circuit, whereby upon energization thereof expansion of said conductor occurs to permit movement of said carriage into said toasting chamber and upon deenergization thereof contraction of said conductor occurs to move said carriage out of said toasting chamber.

8. In an automatic toaster, a pair of spaced heating units arranged to define a toasting chamber therebetween, a movable carriage comprising means for moving a bread slice into and out of said toasting chamber, one of said heating units comprising a movable support, a plurality of turns of a conductor of relatively small cross section wound on said support, said support being movable in response to expansion and contraction of said turns of said conductor, means interconnecting said support and said bread carriage, an electric circuit including both of said heating units, and a control switch for controlling the energization of said electric circuit, whereby upon closing of said control switch expansion of said conductor occurs to permit movement of said carriage into said toasting chamber followed by toasting of said bread slice, and upon opening of said control switch cooling and contraction of said conductor occurs terminating said toasting operation and moving said carriage out of said toasting chamber.

MORRIS W. LOOMER.

REFERENCES CITED

The following references are of record in the file of this patent:

UNITED STATES PATENTS

| Number | Name | Date |
| --- | --- | --- |
| Re. 20,570 | Bushway | Dec. 7, 1937 |
| 954,682 | Low et al. | Apr. 12, 1910 |
| 2,012,603 | Fuchs | Aug. 27, 1935 |
| 2,030,932 | Persons | Feb. 18, 1936 |
| 2,033,178 | Brand | Mar. 10, 1936 |
| 2,036,523 | Freemon | Apr. 7, 1936 |
| 2,099,210 | Ireland | Nov. 16, 1937 |
| 2,102,487 | Schwarz | Dec. 14, 1937 |
| 2,132,622 | Ireland | Oct. 11, 1938 |
| 2,151,401 | Belcher | Mar. 21, 1939 |
| 2,237,147 | Ireland | Apr. 1, 1941 |
| 2,301,070 | Myers | Nov. 3, 1942 |
| 2,337,098 | Gomersall | Dec. 21, 1943 |